(12) United States Patent
Murgia

(10) Patent No.: US 10,051,000 B2
(45) Date of Patent: Aug. 14, 2018

(54) EFFICIENT USE OF IPSEC TUNNELS IN MULTI-PATH ENVIRONMENT

(71) Applicant: Citrix Systems, Inc., Fort Lauderdale, FL (US)

(72) Inventor: Marco Antonio Murgia, Los Gatos, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 17 days.

(21) Appl. No.: 14/811,695

(22) Filed: Jul. 28, 2015

(65) Prior Publication Data
US 2017/0034213 A1    Feb. 2, 2017

(51) Int. Cl.
*H04L 29/06* (2006.01)
*H04W 76/12* (2018.01)
*H04W 76/02* (2009.01)
*H04L 21/00* (2006.01)

(52) U.S. Cl.
CPC ............ *H04L 63/164* (2013.01); *H04L 63/02* (2013.01); *H04L 63/0272* (2013.01); *H04L 63/0428* (2013.01); *H04W 76/022* (2013.01); *H04W 76/12* (2018.02)

(58) Field of Classification Search
CPC ............ H04L 63/0272; H04L 63/0485; H04L 12/4641; H04L 63/029; H04L 63/10; H04L 63/164; H04L 63/166; H04L 63/20
USPC .................. 380/44; 370/235, 236; 726/1, 3; 713/151, 160
See application file for complete search history.

(56) References Cited

U.S. PATENT DOCUMENTS

| | | | | |
|---|---|---|---|---|
| 7,571,463 | B1 * | 8/2009 | Fedyk | H04L 63/065 726/3 |
| 8,477,616 | B1 * | 7/2013 | Rogers | H04L 47/70 370/235 |
| 2004/0215955 | A1 * | 10/2004 | Tamai | H04L 63/0428 713/150 |

(Continued)

FOREIGN PATENT DOCUMENTS

| AU | 2005201275 A1 | 10/2005 |
|---|---|---|
| AU | 2005201275 A1 | 10/2005 |

(Continued)

OTHER PUBLICATIONS

PCT Patent Application US2016/044317 filed Jul. 27, 2016; International Search Report and Written Opinion dated Oct. 5, 2016.

(Continued)

*Primary Examiner* — Gary S Gracia
(74) *Attorney, Agent, or Firm* — Foley & Lardner LLP; Christopher J. McKenna; Paul M. H. Pua

(57) ABSTRACT

A system and method is provided for securing network traffic across a plurality of connections to a computing device without requiring each connection to have its own security association. The system can include an IPsec encoder configured to obtain a datagram and encode a datagram, wherein the IPsec encoder includes a security association that is associated with a computing entity, a packet analyzer configured to associate metadata with the encoded datagram, and a gateway to transmit the encoded datagram using one of the plurality of connections to the computing device.

19 Claims, 9 Drawing Sheets

(56) References Cited

U.S. PATENT DOCUMENTS

| | | | |
|---|---|---|---|
| 2005/0076228 A1* | 4/2005 | Davis | G06F 21/72 |
| | | | 713/188 |
| 2005/0198531 A1 | 9/2005 | Kaniz et al. | |
| 2007/0186100 A1* | 8/2007 | Wakameda | H04L 63/0272 |
| | | | 713/160 |
| 2009/0144819 A1* | 6/2009 | Babbar | H04L 47/10 |
| | | | 726/13 |
| 2010/0098419 A1* | 4/2010 | Levy | H04L 12/2861 |
| | | | 398/63 |
| 2010/0223458 A1* | 9/2010 | McGrew | H04L 9/0833 |
| | | | 713/153 |
| 2013/0039487 A1* | 2/2013 | McGrew | H04L 69/04 |
| | | | 380/44 |
| 2013/0091352 A1* | 4/2013 | Patel | H04L 9/321 |
| | | | 713/156 |
| 2013/0103940 A1* | 4/2013 | Badea | H04L 43/50 |
| | | | 713/160 |
| 2013/0263249 A1 | 10/2013 | Song et al. | |
| 2013/0298182 A1* | 11/2013 | May | H04L 63/0272 |
| | | | 726/1 |
| 2013/0311778 A1* | 11/2013 | Cherukuri | H04L 63/0272 |
| | | | 713/171 |
| 2014/0101435 A1* | 4/2014 | Kinoshita | H04L 63/164 |
| | | | 713/151 |
| 2015/0085664 A1* | 3/2015 | Sachdev | H04L 41/5019 |
| | | | 370/236 |
| 2015/0195265 A1* | 7/2015 | Chen | H04L 63/08 |
| | | | 726/3 |
| 2015/0295899 A1* | 10/2015 | Chen | H04L 63/0428 |
| | | | 713/160 |

FOREIGN PATENT DOCUMENTS

| | | | |
|---|---|---|---|
| WO | 2007103338 | A2 | 9/2007 |
| WO | WO-2007/103338 | A2 | 9/2007 |
| WO | 2015047143 | A1 | 4/2015 |
| WO | WO-2015/047143 | A1 | 4/2015 |

OTHER PUBLICATIONS

Zhang, Yun-he, "A Multi-Link Aggregate IPSEC Model," 2009 First International Workshop on Education Technology and Computer Science, 2009 IEEE, pp. 489-493.

International Search Report and Written Opinion for International Appl. No. PCT/US2016/044317, dated Oct. 5, 2016.

* cited by examiner

EFFICIENT USE OF IPSEC TUNNELS IN MULTI-PATH ENVIRONMENT

BACKGROUND

In modern computing environments, there is often a need to connect remote computing systems together using a network. For example, organizations such as corporations often have branch offices, employees, or contractors spread across multiple locations both within a country and worldwide. Current networking technologies allow communication between these disparate computing environments through both public and private computer networks. Often, separate computing environments are connected to each other using the Internet. By allowing offices and employees to connect to each other, an organization can create a unified computing environment.

Connecting an organization across both publicly and privately linked networks can pose a security risk for sensitive data. As data passes across the Internet or other public networks, it becomes vulnerable to many different kinds of electronic attacks. While individual applications or connections can utilize protections such as encryption, organizations have an interest in providing a secure link between offices or employees for all network traffic. A variety of techniques can be used to provide such a link. For example, organizations may purchase or lease a direct physical connection between two locations that is not open to the public. Additionally, organizations can employ applications that encrypt data. Or organizations can utilize traditional Virtual Private Networks to allow for secure communication.

In addition to protecting sensitive data against security vulnerabilities, organizations must ensure that connections between remote computing environments are reliable and efficient. Organizations can improve reliability in a number of ways including utilizing multiple connections across different internet service providers or networks in order to ensure that if one connection fails, other connections are available to maintain the network. Connections can traverse public networks, such as the Internet, or directly connect two endpoints on a private link. Organizations can increase efficiency by spreading their network traffic across multiple connections to increase overall bandwidth or by employing specific networking protocols that can increase efficiency when used on direct, private links. In some instances, organizations might also utilize specific types of connections for specific applications or purposes that are separate from their general network traffic.

While organizations can utilize various technologies to address security and reliability issues separately, addressing both issues simultaneously can present technical challenges. Organizations can use technologies like Internet Protocol Security ("IPsec"), described in more detail below and in the Internet Engineering Task Force ("IETF") Request For Comment ("RFC") 4301, to create a secure connection for all network traffic on a specific connection. IPsec, however, requires creating a shared set of credentials between a source and destination to allow for the secure communication. These credentials must be negotiated using a technology, such as Internet Key Exchange ("IKE"). The credentials and other security parameters that define an IPsec connection are referred to as a Security Association ("SA"). Anytime a link disconnects, a new SA must be established when the link returns, thereby adding to the overhead of maintaining the link. Further, each one-way connection requires its own SA. When both encryption and authentication are utilized, a common approach to ensure proper security, one or two SAs are necessary for each one-way link depending on the specific variation of IPsec that is utilized. Accordingly, every two-way connection between endpoints requires the negotiation of either two or four SAs to setup. Maintaining an IPsec setup across a typical two-way link can be fairly simple. But as the number of redundant or additional links grows, so does the number of SAs that must be negotiated and maintained. Maintaining multiple simultaneous IPsec connections to ensure reliable and secure communication in modern computing networks results in significant networking overhead and managerial challenges.

BRIEF DESCRIPTION OF THE DRAWINGS

Reference will now be made to the accompanying drawings showing example embodiments of this disclosure. In the drawings.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide for secure communication between two network endpoints. These endpoints can be connected through one or more network connections. The secure communication provided by the described embodiments can utilize multiple network pathways simultaneously while only requiring the setup and maintenance for one IPsec connection. These technologies can drastically reduce the overhead and maintenance requirements for managing IPsec communications over multiple simultaneous links. Further in eliminating much of the overhead required to provide IPsec communications across multiple pathways, these technologies improve network efficiency and bandwidth. The embodiments described can additionally provide for intelligent selection of individual pathways based on data associated with each datagram transmitted across the networks.

Figure 1:
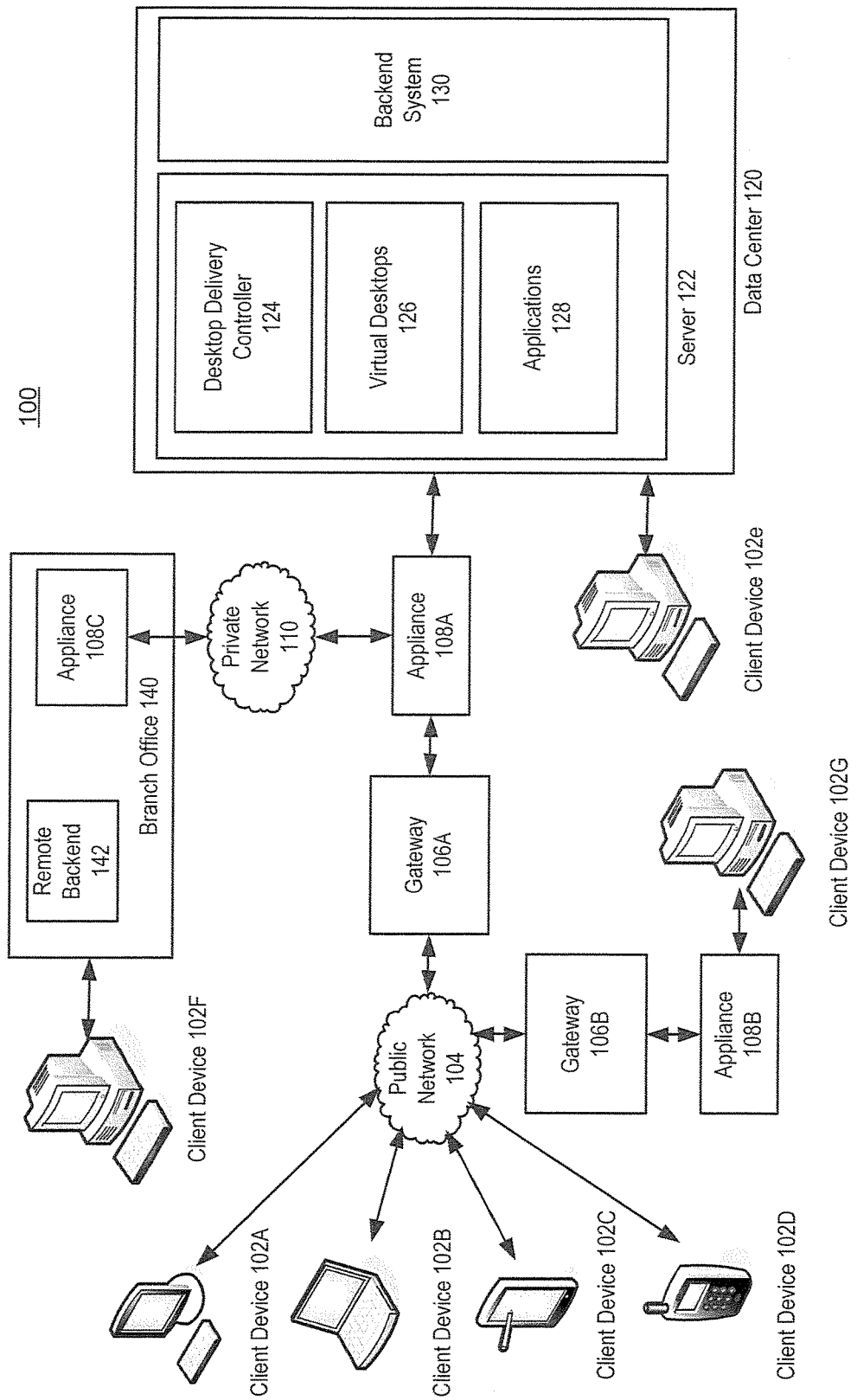
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102, a public network 104, one or more gateways 106, one or more appliances 108, a private network 110, a data center 120, and a branch office 140.

One or more client devices 102 are devices that can acquire remote services from data center 120 through various means. Client devices 102 can communicate with data center 120 either directly (e.g., client device 102E) or indirectly through a public network 104 (e.g., client devices 102A-D) or a private network 110 (e.g., client device 102F). When client device 102 communicates through public network 104 or private network 110, a communication link can be established. For example, a link can be established by public network 104, gateway 106A, and appliance 108A, thereby providing a client device (e.g., client devices 102A-D) access to data center 120. A link can also be established by branch office 140 including appliance 108C, private network 110, and appliance 108A, thereby providing a client device (e.g., client device 102F) access to data center 120. Additional links can also be established by appliance 108B, gateway 106B, public network 104, gateway 106A and appliance 108A providing client device 102G with access to data center 120 through a public network 104. While client devices 102 are portrayed as a computer (e.g., client devices 102A, 102E, 102F, and 102G), a laptop (e.g., client device 102B), a tablet (e.g., client device 102C), and a mobile smart phone (e.g., client device 102D), it is appreciated that client device 102 could be any type of device (e.g., such as a wearable smart watch) that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network or a wireless network.

Gateways 106A-B are physical devices or are software that is part of a physical device that interfaces between two networks having different protocols. Gateways 106A-B, for example, can be a server, a router, a host, or a proxy server. In some embodiments, gateways 106A-B can include or be coupled to a firewall separating gateways 106A-B from public network 104 (e.g., Internet). Gateways 106A-B have the ability to modify signals received from client device 102 into signals that appliances 108A-B and/or data center 120 can understand and vice versa.

Appliance 108A is a device that can optimize and control wide area network (WAN) traffic. In some embodiments, appliance 108A optimizes other types of network traffic, such as local area network (LAN) traffic, metropolitan area network (MAN) traffic, or wireless network traffic. Appliance 108A can also handle different network like Multiprotocol Label Switching ("MPLS") common in many corporate networks. Appliance 108A can optimize network traffic by, for example, scheduling data packets in an established communication link so that the data packets can be transmitted or dropped at a scheduled time and rate. In some embodiments, appliance 108A is a physical device, such as Citrix System's Branch Repeater, Netscaler, or CloudBridge. In some embodiments, appliance 108A can be a virtual appliance. In some embodiments, appliance 108A can be a physical device having multiple instances of virtual machines (e.g., virtual Cloud Bridge). In some embodiments, a first appliance (e.g., appliance 108A) works in conjunction with or cooperation with a second appliance (e.g., appliance 108B or appliance 108C) to optimize network traffic. For example, the first appliance can be located between the WAN and a corporate LAN (e.g., data center 120), while a second appliance (e.g., appliance 108C) can be located between a branch office (e.g., branch office 140) and a WAN connection. An additional appliance (e.g., appliance 108B) could also be connected through public network 104. In some embodiments, the functionality of gateway 106A and appliance 108A can be located in a single physical device. Appliances 108A, 108B, and 108C can be functionally the same or similar.

Data center 120 is a central repository, either physical or virtual, for the storage, management, and dissemination of data and information pertaining to a particular public or private entity. Data center 120 can be used to house computer systems and associated components, such as one or physical servers, virtual servers, and storage systems. Data center 120 can include, among other things, one or more servers (e.g., server 122) and a backend system 130. In some embodiments data center 120 can include gateway 106, appliance 108, or a combination of both.

Server 122 is an entity represented by an IP address and can exist as a single entity or a member of a server farm. Server 122 can be a physical server or a virtual server. In some embodiments, server 122 can include a hardware layer, an operating system, and a hypervisor creating or managing one or more virtual machines. Server 122 provides one or more services to an endpoint. These services include providing one or more applications 128 to one or more endpoints (e.g., client devices 102A-G or branch office 140). For example, applications 128 can include Windows™-based applications and computing resources.

Desktop delivery controller 124 is a device that enables delivery of services, such as virtual desktops 126 to client devices (e.g., client devices 102A-G or branch office 140). Desktop delivery controller 124 provides functionality required to manage, maintain, and optimize all virtual desktop communications.

In some embodiments, the services include providing one or more virtual desktops 126 that can provide one or more applications 128. Virtual desktops 126 can include hosted shared desktops allowing multiple user to access a single shared Remote Desktop Services desktop, virtual desktop infrastructure desktops allowing each user to have their own virtual machine, streaming disk images, a local virtual machine, individual applications (e.g., one or more applications 128), or a combination thereof.

Backend system 130 is a single or multiple instances of computer networking hardware, appliances, or servers in a server farm or a bank of servers and interfaces directly or indirectly with server 122. For example, backend system 130 can include Microsoft™ Active Directory, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle backend server, a SQL Server backend, and/or a dynamic host configuration protocol (DHCP). Backend system 130 can provide data, services, or a combination of both to data center 120, which can then provide that information via varying forms to client devices 102 or branch office 140.

Branch office 140 is part of a local area network (LAN) that is part of the WAN having data center 120. Branch office 140 can include, among other things, appliance 108C and remote backend 142. In some embodiments, appliance 108C can sit between branch office 140 and private network 110. As stated above, appliance 108C can work with appliance 108A. Remote backend 142 can be set up in similar manner as backend system 130 of data center 120. Client device 102F can be located on-site to branch office 140 or can be located remotely from branch office 140.

Figure 2A:
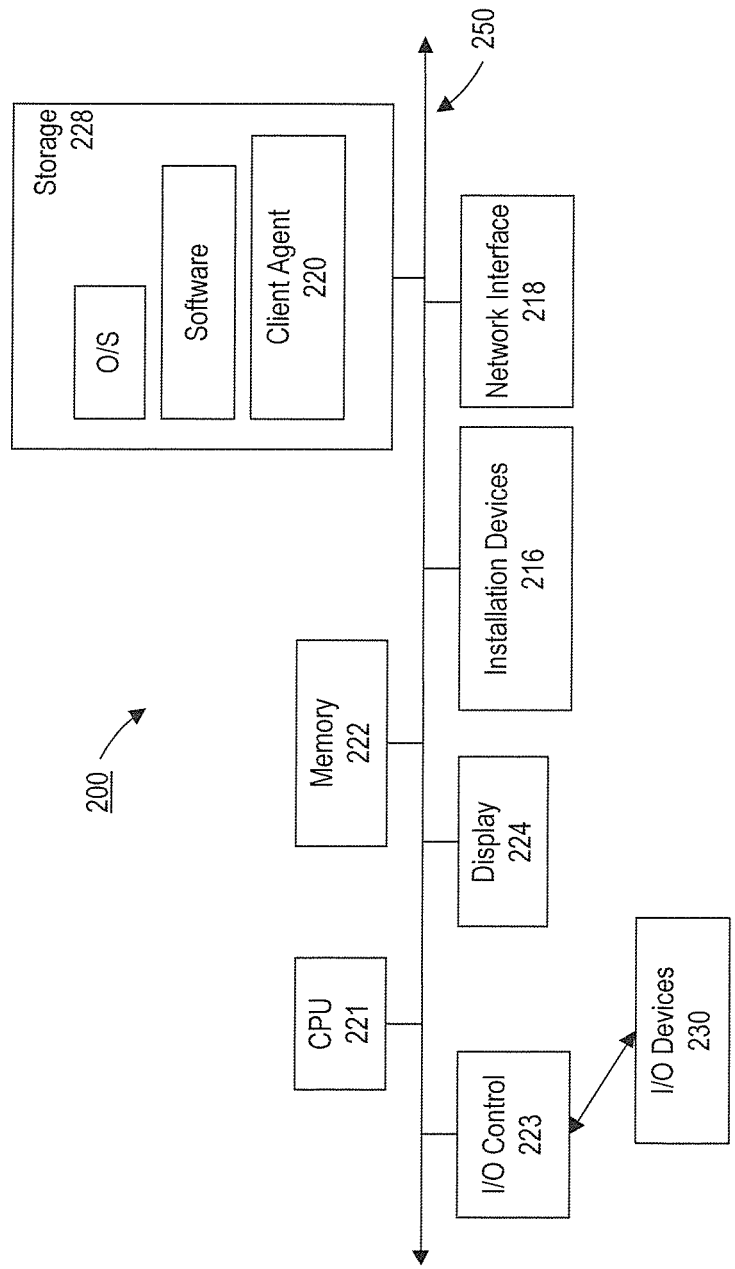
FIGS. 2A-2B are block diagrams of an exemplary computing device, consistent with embodiments of the present disclosure.
Figure 2B:
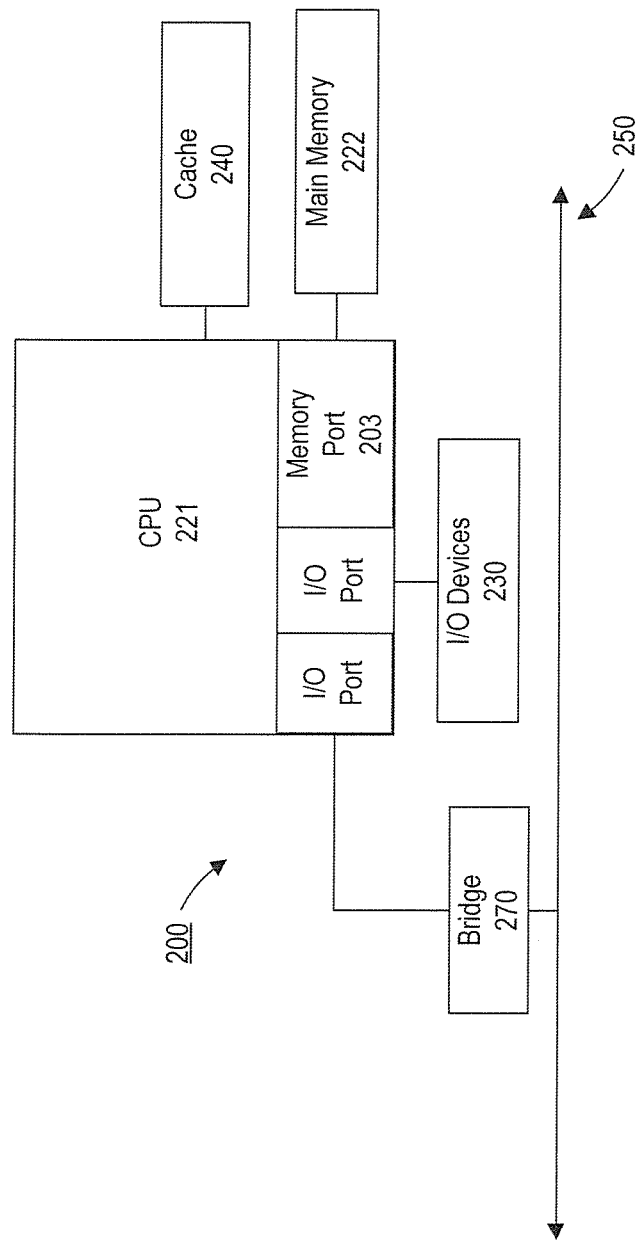

Appliances 108A-C and gateways 106A-B can be deployed as or executed on any type and form of computing device, such as a computer or networking devices capable of communicating on any type and form of network described herein. As shown in FIGS. 2A-2B, each computing device 200 includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), a RAM, a PROM, EPROM, FLASH-EPROM or any other flash memory, a cache, a register, any other memory chip or cartridge, or a semiconductor memory. Main memory 222 can be one or more memory chips capable of storing data and allowing any storage location to be directly accessed by CPU 221. Main memory 222 can be any type of random access memory (RAM), or any other available memory chip capable of operating as described herein. In the exemplary embodiment shown in FIG. 2A, CPU 221 communicates with main memory 222 via a system bus 250. Computing device 200 can also include a visual display device 224 and an input/output (I/O) device 230 (e.g., a keyboard, mouse, or pointing device) connected through I/O controller 223, both of which communicate via system bus 250. One of ordinary skill in the art would appreciate that CPU 221 can also communicate with memory 222 and other devices in manners other than through system bus 250, such as through serial communication manners or point-to-point communication manners. Furthermore, I/O device 230 can also provide storage and/or an installation medium for the computing device 200.

FIG. 2B depicts an embodiment of an exemplary computing device 200 in which CPU 221 communicates directly with main memory 222 via a memory port 203. CPU 221 can communicate with a cache 240 via a secondary bus, sometimes referred to as a backside bus. In some other embodiments, CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port. In further embodiments, I/O device 230 can be a bridge 270 between system bus 250 and an external communication bus, such as a USB bus, an Apple Desktop Bus, an RS-232 serial connection, a SCSI bus, a Fire Wire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

As shown in FIG. 2A, computing device 200 can support any suitable installation device 216, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Networking can encompass many different technologies and protocols designed to connect two or more computing devices, systems, or environments. For example, the Internet Protocol ("IP") is a standard communications protocol commonly used to control and route Internet traffic. IP is widely used as a backbone protocol for the Internet. The most commonly used versions of IP are IP version 4 ("IPv4") and IP version 6 ("IPv6"). These protocols are described in IETF RFC 791 and IETF RFC 2460 respectively and are both well known in the art.

Connections transmitting IP Datagrams (also commonly referred to as packets) can be secured using IPsec, a suite of protocols that build on IP. IPsec provides a framework for modifying each datagram before it is sent across the network to provide a secure connection between computing entities. A computing entity can be a hardware implemented computing device (e.g., any of gateways 106, appliances 108, client devices 102 from FIG. 1) or a virtual computing device (e.g., a software module executing on appliances 108) capable of receiving datagrams. Specific modes and variants of IPsec operation are described in more detail below. Before IPsec can be used to encapsulate IP datagrams, the two endpoints of the IPsec connection can negotiate a set of security parameters to use to protect the transmitted data. These security parameters can be created and shared outside of a computer network environment. Alternatively, these security parameters can be set up using known methods such as IKE to create an SA. Each one-way connection between two endpoints requires an SA. Accordingly, a two-way IPsec connection using either the Authentication Header ("AH") or Encapsulating Security Protocol ("ESP") variant of IPsec requires at least two SAs. In some embodiments, where both AH and ESP are used in combination, as many as four SAs can be required for two-way communication between endpoints.

Attempts have been made to support IPsec across multiple connections. For example *A Multi-link Aggregate IPSec Model*, Yun-he hang, et al., 3 Educ., Tech., and Computer Sci.: ETCS '09. First Int'l Workshop On, 489-493 (2009), proposed a software component that automatically manages IPsec across multiple connections between two endpoints. While this approach abstracts the IPsec management and overhead into a separate module making the use of IPsec across multiple simultaneous connections simpler for developers, the fundamental problems with IPsec across multiple connections remain—namely, as the number of connections increase, the software or hardware, regardless of the level of abstraction still must maintain SAs for each connection and incur the overhead of rebuilding each individual link that fails. Further, these approaches attempt to provide load balancing across the multiple connections by determining latency and other network characteristics at the time the SAs are created. But because these existing modules are unable to continually monitor properties of each connection, the provided load balancing is ineffective. Further, because these methods cannot analyze the contents of the encrypted datagrams they cannot provide quality-of-service benefits based on data content. Embodiments consistent with the present disclosure resolve these fundamental problems. These embodiments are described in more detail below.

Figure 3A:
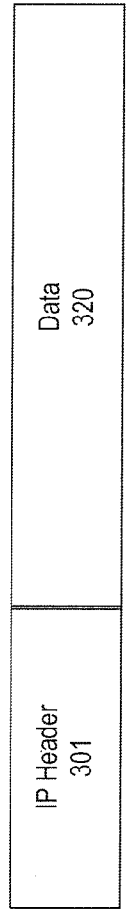
FIG. 3A-3C are block diagrams of exemplary datagrams, consistent with embodiments of the present disclosure.
Figure 3B:
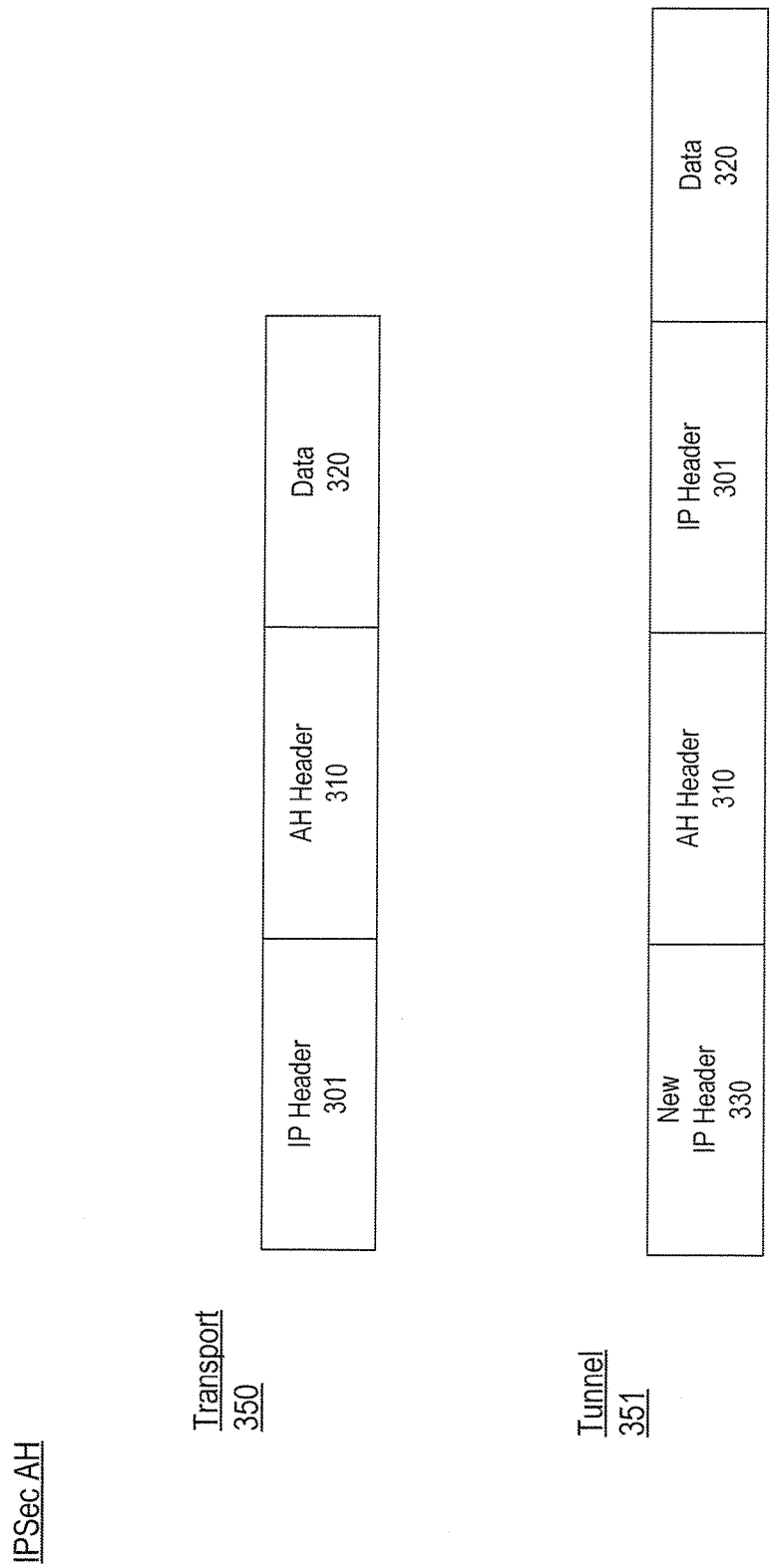
Figure 3C:
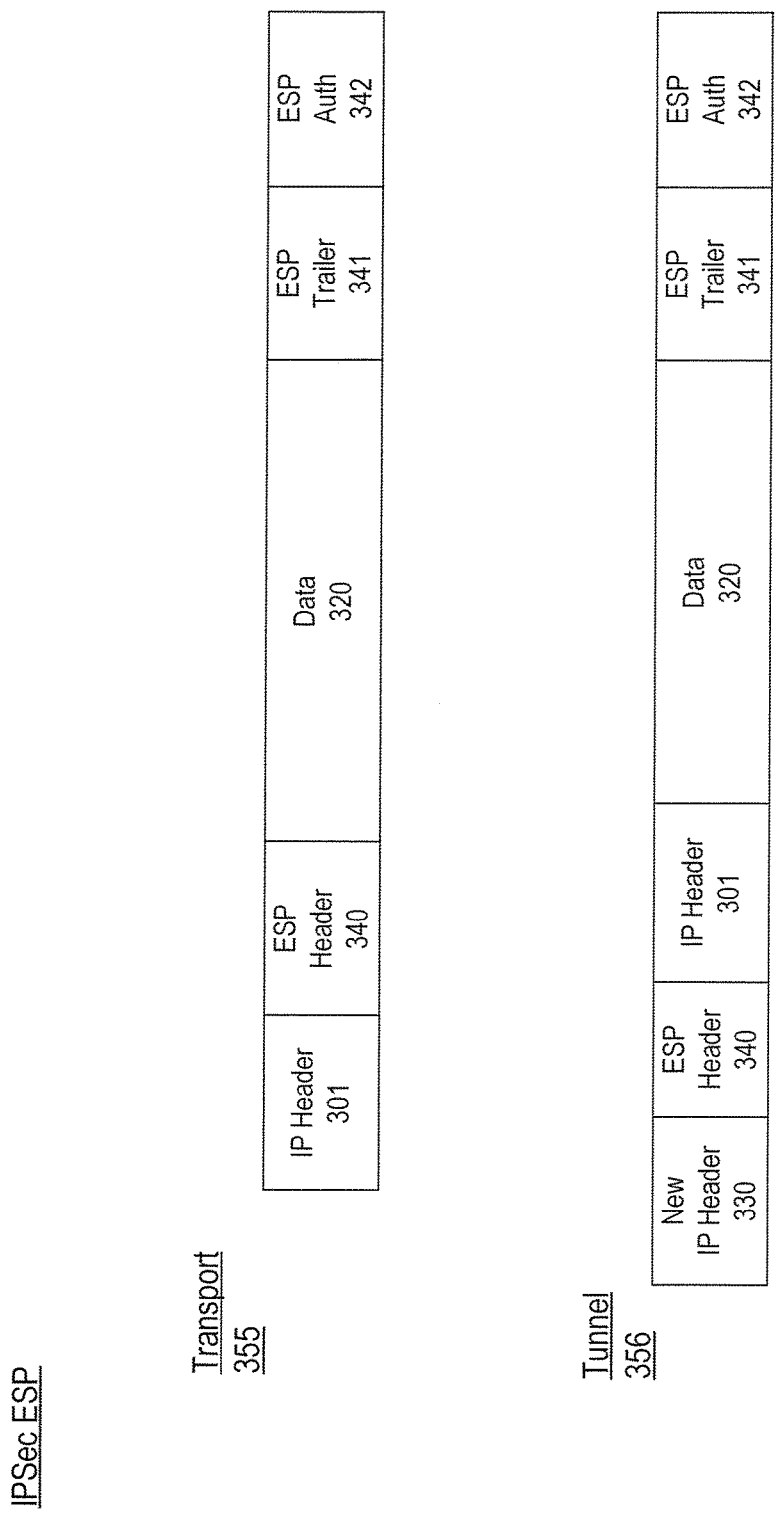

FIGS. 3A-3C are block diagrams of exemplary datagrams consistent with the present disclosure. FIG. 3A is a block diagram representing a standard IP datagram 300, consistent with embodiments of the present disclosure. IP datagram 300 is a networking packet that contains information to allow routing of data across the Internet or other networks. IP datagram 300 can be an IP datagram consistent with either IPv4 or IPv6. IP datagram 300 can include IP header 301, which can contain a variety of information and settings that control how IP datagram 300 is transmitted across a network. For example, IP header 301 can include host information in the form of IP addresses to indicate the source and destination for the datagram. In addition to IP header 301, IP datagram 300 include IP data 320. IP data 320 can include raw data or include additional encapsulations of data in protocols such as the well-known User Datagram Protocol or the Transmission Control Protocol.

The datagrams in FIG. 3B include the IPsec AH datagram both in transport 350 mode and tunnel 351 mode. As in FIG. 3B, the datagrams shown in FIG. 3C include the IPsec ESP datagram in transport 355 mode and tunnel 356 mode.

FIGS. 3B-3C represent exemplary IP datagrams modified to conform to various IPsec modes of operation. IPsec can encode IP datagrams according to various modes. In particular IPsec can create Authentication Header ("AH") datagrams or Encapsulating Security Payload ("ESP") datagrams. Each of these types of encapsulation can further be used in either transport mode or tunnel mode. Each of these configurations is described in more detail below.

IPsec AH allows for the modification of IP datagrams so that the datagram can be authenticated. This authentication can, among other things, allow verification of the datagram source and/or ensure that the datagram has not changed in transit. IPsec AH does not provide for the encryption of the datagram although the data encapsulated in the datagram can be encrypted prior to modification by IPsec using some other process or application. IPsec AH can verify data by calculating a cryptographic hash of some of the fields in the datagram's IP header (e.g., IP header 301) and transmitting the calculated hash with the datagram.

IPsec ESP can allow for encryption of the IPsec payload, which includes the original IP datagram (e.g., IP datagram 300). IPsec ESP can also provide authentication using a cryptographic hash of the fields in the various headers similar to IPsec AH.

Generally, transport mode provides IPsec protection, in either AH or ESP form, from a source endpoint to a destination endpoint. Transport mode can be used to secure a direct link between two hosts.

Tunnel mode provides IPsec protection, in either AH or ESP form, along a portion of a connection between two endpoints. Although, tunnel mode can be used to secure the entire path between two endpoints, it is commonly used when two endpoints on separate secure networks communicate across an unsecured network such as the Internet. Tunnel mode can allow for only the portion of the connection crossing the public, unsecured network to be encapsulated with IPsec.

FIG. 3B is a block diagram of exemplary IP datagram 300 encapsulated using IPsec AH, consistent with embodiments of the present disclosure. In transport 350 mode, IPsec can calculate the cryptographic hash and insert the calculated hash as part of AH header 310. AH header 310 can be inserted into the original IP datagram between IP header 301 and data 320. At the destination specified in IP header 301, a new cryptographic hash can be calculated and compared against the information stored in AH header 310. If the hashes match, AH header 310 can be removed from the datagram leaving the original IP datagram 300. IP datagram 300 can then be provided to the relevant process or application.

In tunnel 351 mode, IPsec calculates the cryptographic hash in the same way as can be done in transport 350 mode. In tunnel 351 mode, AH header 310 is placed before IP header 301. The entire datagram (e.g., AH header 310, IP header 301, and data 320) is then encapsulated in a new IP header that can specify new IP fields for the datagram. At the destination specified in new IP header 330, the destination can remove new IP header 330, perform the same authentication check using AH header 310 as is done in transport 350 mode, strip AH header 310, and route IP datagram 300 based on the original destination and fields in IP header 301.

FIG. 3C is a block diagram of exemplary IP datagram 300 encapsulated using IPsec ESP, consistent with embodiments of the present disclosure. In transport 355 mode, IPsec can encrypt data 320 using a standard encryption algorithm (e.g., DES, triple-DES, AES, and Blowfish) and predetermined encryption keys and include ESP header 340 and ESP trailer 341 in the datagram and surrounding data 320. ESP header 340 and ESP trailer 341 can include information to assist with decryption. Optionally, IPsec ESP can include authentication by calculating a cryptographic hash in a similar manner done in IPsec AH and can include the authentication details in ESP auth 342. At the destination specified in IP header 301, authentication information, if it is included, can be verified and ESP auth 342 can be stripped from the datagram. Further, data 320 can be decrypted using predetermined encryption keys stored in an associated SA and the information in ESP header 340 and ESP trailer 341. The destination can strip ESP header 340 and ESP trailer 341 following decryption leaving only the original IP datagram consisting of IP header 301 and data 320. The IP datagram can then be provided to the relevant process or application.

In tunnel 356 mode, IPSec ESP encrypts the entire original IP datagram, including both IP header 301 and data 320. ESP header 340 is placed before IP header 301 and ESP trailer 341 is placed after data 320. As with transport 355 mode, optional authentication can be provided using a cryptographic hash of various header fields that are included in ESP auth 342. IPsec ESP can create new IP header 330 to control routing of the encapsulated datagram and places it at the beginning of the datagram. At the destination specified in new IP header 330, the destination device can verify the information in ESP auth 342, decrypt IP Header 301 and data 320 using the information in ESP header 340, ESP trailer 341, and predetermined keys, remove new IP header 330, ESP header 340, ESP trailer 341, and ESP auth 342 from the datagram, and route the datagram according to the original information in IP header 301.

Figure 4:
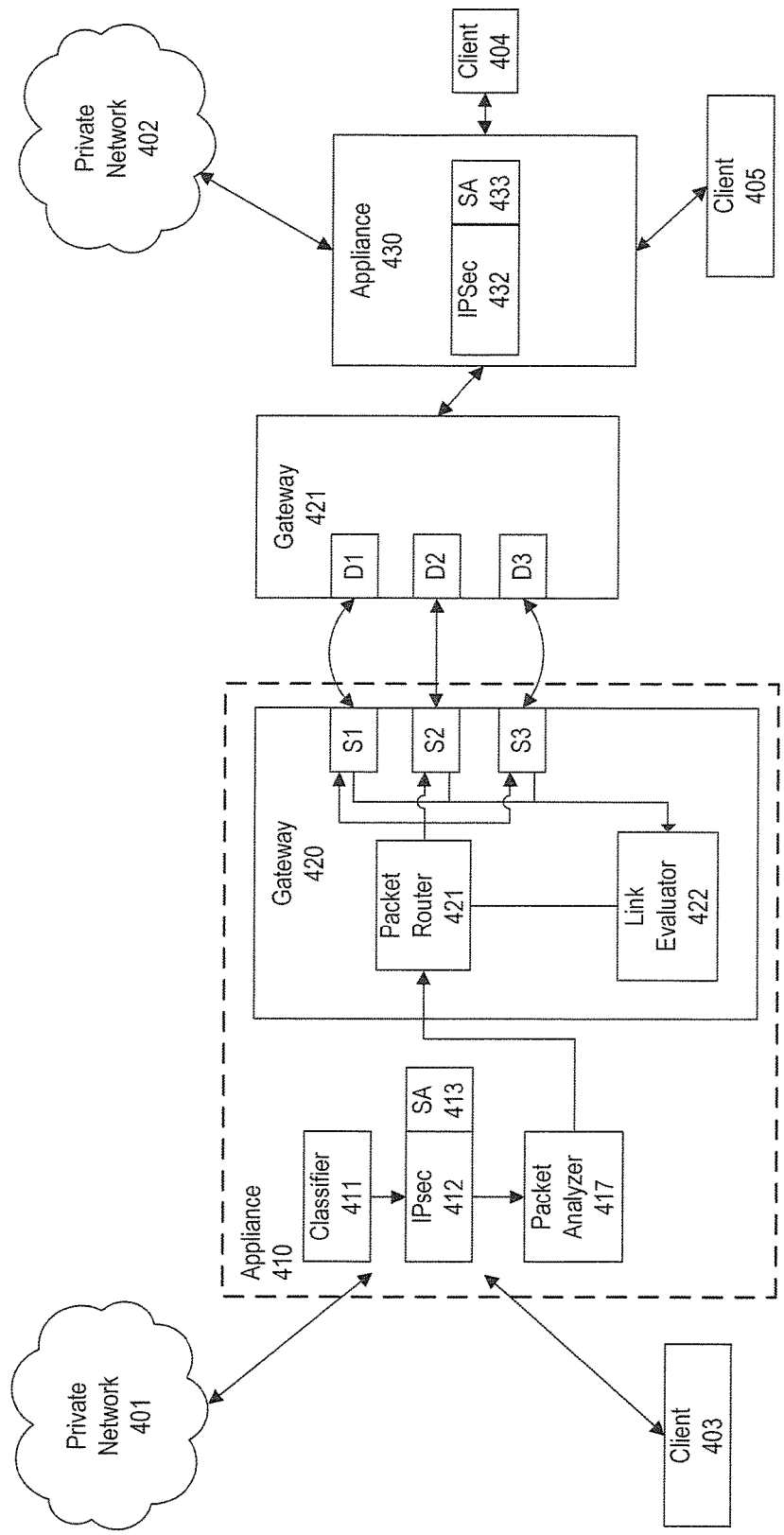
FIG. 4 is a block diagram of an exemplary appliance provided in an exemplary network environment, consistent with embodiments of the present disclosure.

FIG. 4 is a block diagram of an exemplary appliance 410 provided in an exemplary network environment, consistent with embodiments of the present disclosure. Appliance 410 can be any of appliances 108A-C from FIG. 1. Appliance 410 can be a module, which is a packaged functional hardware unit designed for use with other components or a part of a program that performs a particular function of related functions. In some embodiments, appliance 410 can also include a gateway that can be any of gateways 106A-B from FIG. 1. Generally, appliance 410 can process outgoing packets and can accept datagrams from other networks (e.g., private network 401) or client devices (e.g., client 403). Appliance 410 can process the datagrams, analyzing their contents, produce IPsec protected datagrams and forward those datagrams across any one of multiple connections based on the information previously analyzed. Appliance 410 can support multiple simultaneous connections without needing to create additional SAs to support IPsec.

Private network 401 can be any private network attached to additional computing devices. Private network can be private network 110 from FIG. 1. Devices or other computing devices attached to private network 401 can send datagrams intended for another network or device to appliance 410 for processing.

Similarly, client 403 can provide datagrams intended for other networks or devices to appliance 410 for processing. Client 403 can be one of client devices 102A-G. Client 403 can be directly connected to appliance 410 without passing through an intermediate network.

Appliance 410 can receive datagrams from private network 401, client 403, or any other computing device sending data to a network or computing device reachable by appliance 410. Appliance 410 can be source S1-S3 for multiple links connecting to destinations D1-D3, respectively. While appliance 410 is shown as the source of network connections, it is appreciated that appliance 410 can also receive data from other network devices or computers intended for private network 401 or client 403. Appliance 410 can consist of multiple components designed to provide a single IPsec channel across a network. In some embodiments appliance 410 is combined with gateway 420. In other embodiments gateway 420 is a separate component communicatively coupled with appliance 410.

Appliance 410 includes classifier 411. Classifier 411 is a module that can analyze datagrams supplied to appliance 410. Classifier 411 can inspect the datagrams and create metadata associated with the datagram to assist with routing decisions. The metadata associated with each datagram can be based on a variety of factors (e.g., the source or destination IP address, the underlying application, the additional protocols used in the datagram, the content of the datagram itself, or other attributes of the datagram). This metadata can be assigned according to preset rules or can be dynamic based on changing requirements of the system. For example, if the data in the IP datagram corresponds to type of traffic, metadata that indicates the particular DSCP tag can be added to the datagram. In this example, the metadata can indicate that the datagram contains Voice over IP ("VOIP") traffic classified using DSCP tag Expedited Forwarding ("EF") that can require a higher priority than other types of network traffic. When routing decisions are made, the specific metadata can affect the links that are chosen for different types of traffic. For example, datagrams associated with DSCP tag EF can be transmitted using a specific physical link best suited to this type of traffic. Datagrams with metadata that indicate the datagram carries VOIP traffic can be transmitted using low latency and low jitter connections to ensure a higher quality of service.

After metadata is associated with the IP datagram, the datagram is provided to IPsec 412. IPsec 412 is a module designed to encode an IP datagram consistent with the IPsec specification and based on the properties stored in SA 413. SA 413 can be an SA created according to a process such as IKE to allow IPsec communication with a desired endpoint (e.g., gateway 421 or appliance 430). SA 413 is created prior to datagrams being transmitted by appliance 410. Many IPsec modules commonly available can be incorporated into appliance 410 to provide the functionality described for IPsec 412.

Packet analyzer 417 is a module designed to analyze encoded datagrams and associated metadata, to provide routing information, and to add additional fields to the datagram. For example, packet analyzer might determine, based on the metadata provided by classifier 411, that the datagram should be sent using an MPLS connection. In another example, packet analyzer 417 will determine that the datagram can be sent according to the fastest route or that the datagram has a low importance and can be prioritized below other network traffic. These determinations can be associated with the encoded datagram as additional metadata. Further, packet analyzer 417 can add a timestamp and sequence number to the encoded datagram. This timestamp and sequence number can be used by a receiving appliance (e.g., appliance 430) to reassemble a sequence of datagrams that were sent across different physical links in the proper order. After analysis, packet analyzer can provide the datagram and associated metadata to gateway 420.

Gateway 420 is a module designed to handle the routing and physical connections to remote networks and devices. As previously described, in some embodiments, gateway 420 is part of appliance 410. In other embodiments gateway 420 is a separate module. Gateway 420 provides physical connections to other networks or computing devices. Additionally, gateway 420 can include modules or functionality designed to route network traffic and monitor physical network links. When physical network links fail, gateway 420 can re-establish the connection. Because SA is setup at a virtual endpoint prior to gateway 420, re-establishing physical links does not require the overhead associated with creating new SAs. Instead, when physical links are re-established, they are already part of the IPsec protected pathway without the need for a new SA.

Gateway 420 can include packet router 421. Packet router 421 is a module designed to route IP datagrams according to the content and metadata associated with those datagrams, and the current state of the various network connections. Packet router 421 can base routing decisions solely on the information in the datagram's metadata or can combine the metadata information with information provided by link evaluator 422. Link evaluator 422 is described in more detail below. Packet router 421 can use the provided information to select the optimal link (e.g., one of network connections represented by network sources S1-S3) for a specific datagram. For example, if packet analyzer 417 has designated that a datagram contains data classified as DSCP tag EF, packet router 421 can choose a dedicated physical link for best suited for this type of traffic. In another example, if data provided by link evaluator 422 indicates that a particular link is degraded or overwhelmed, packet router 421 can avoid adding new traffic to that physical link. After packet router 421 chooses a link, the datagram can be transmitted on the selected connection.

Link evaluator 422 is a module designed to continually analyze the status of active network connections. After datagrams are transmitted from sources S1-S3, the source can provide transmission statistics to link evaluator 422. This can include the time for the datagram to reach one of destinations D1-D3, the error rate of a particular connection, or any other statistic relevant to the status of a network link. Link evaluator 422 can combine the information from each of the network connections and provide that information to packet router 421 to assist with routing decisions. Additionally, link evaluator 422 can detect when a particular connection has failed and alert gateway 420 that the link must be re-established.

Datagrams transmitted by gateway 420 can be received at destinations D1-D3 of gateway 421. Gateway 421 is a module designed to receive datagrams arriving on multiple physical connections and combine them into a single datagram stream for decoding. Although not shown in FIG. 4, gateway 421 can include the same components as gateway 421 for transmitting datagrams. Accordingly, in some embodiments, the communication between gateway 420 and gateway 421 is two-way, meaning that gateway 421 can operate as both a destination and a source. Gateway 421 can forward the datagrams received at destinations D1-D3 to appliance 430.

Appliance 430 can include IPsec module 432, which can decode an IP datagram consistent with the IPsec specification and based on the properties stored in SA 433. SA 433 can be an SA setup according to a process such as IKE to allow IPsec communication with a desired endpoint. (e.g., gateway 420 or appliance 410). SA 433 is created prior to datagrams being received by appliance 430. Many IPsec modules commonly available can be incorporated into appliance 430 to provide the functionality described for IPsec 432. IPsec 432 can have the same structure and functionality as IPsec 412 (and vice versa). Further, SA 433 can match SA 413 to allow IPsec 432 to decode datagrams encoded with IPsec 412.

After decoding the received datagrams, appliance 430 can route the datagrams according to the IP addresses in the original IP headers. The datagrams can, for example, be routed directly to client device 405 or 404, which can be an example of client device 102 from FIG. 1. Datagrams can also be forwarded to private network 402 for further routing. Private network 402 can be an example of private network 110 from FIG. 1.

The block diagram of FIG. 4 demonstrates an embodiment consistent with the present disclosure that allows, for example, a client device (e.g., client device 403) to communicate in a secure manner with a remote client device (e.g., client device 405). As shown in FIG. 4, creating the IPsec tunnel at appliance 410 and appliance 430 instead of at the location of the physical network links (e.g., S1-S3 to D1-D3) allows for a single set of SAs to be negotiated for the network path even though there may be multiple physical links between the two endpoints. By analyzing packets before they are routed (e.g., at packet analyzer 417), the disclosed embodiments can intelligently route traffic to optimize the available network links. Further, by abstracting the IPsec administration and setup away from the physical links, the disclosed embodiments can eliminate much of the overhead and difficulty with managing a separate IPsec tunnel for each physical link. Moreover, the disclosed embodiments improve prior systems that only encapsulate multi-link IPsec tunnel management into a separate module or component without reducing or eliminating the overhead and difficulties associated with maintaining multiple IPsec connections.

The embodiment and modules or components disclosed in FIG. 4 are exemplary. It is appreciated that many of the components could be combined or separated and placed in different configurations. The structure of FIG. 4 is not meant to be limiting.

Figure 5:
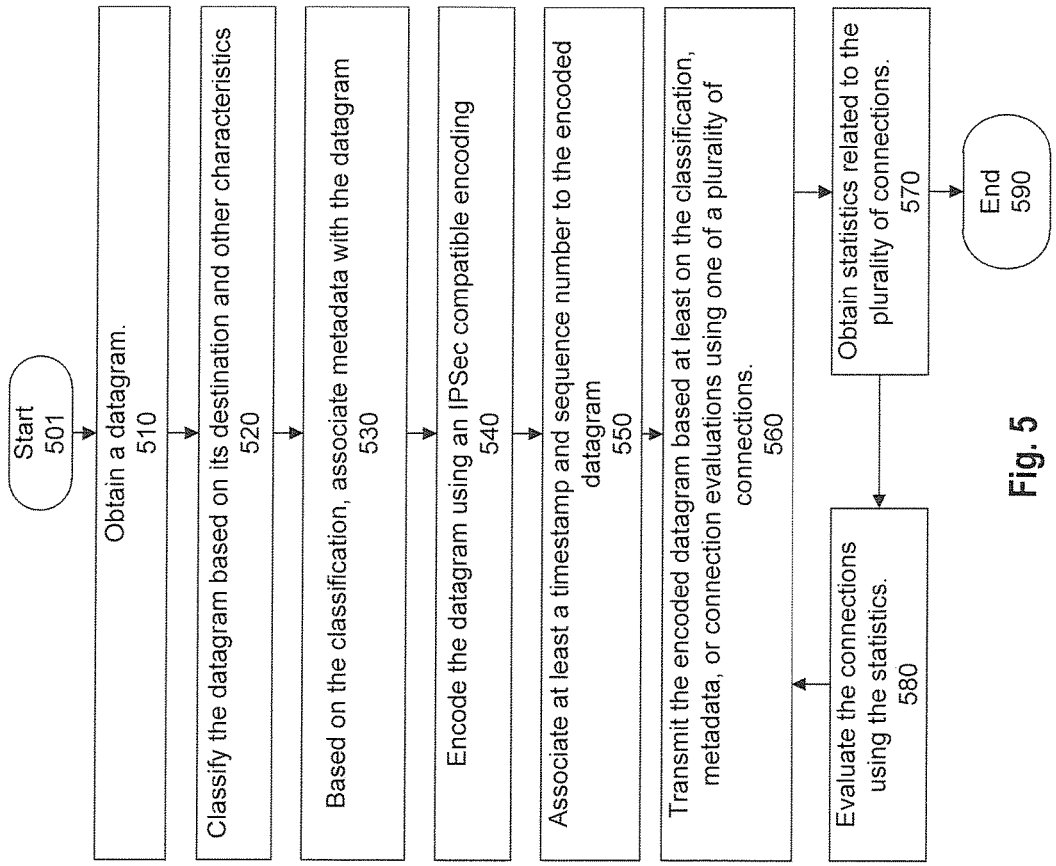
FIG. 5 is a flowchart representing an exemplary method of transmitting datagrams, consistent with embodiments of the present disclosure.

FIG. 5 is a flowchart representing an exemplary method 500 for providing an IPsec encoded datagram to a remote computing environment across multiple physical links. It will be readily appreciated that the illustrated procedure can be altered to delete steps or further include additional steps. After an initial start step 501, an appliance (e.g., appliance 410) can obtain (step 510) an IP datagram intended for transmission to a remote computing environment. The obtained datagram can originate at a local client (e.g., client 403) or some other computing device communicatively coupled to the appliance.

The appliance can then classify (step 520) the datagram according to the destination and other characteristics. For example, a classifier (e.g., classifier 411) can be used to consider, inter alia, the type of datagram, the type of the data or protocol within the datagram, and the relative importance of the datagram related to other network traffic.

After classifying the datagram, the classifier can associate (step 530) metadata with the datagram based on the classification. This metadata can describe the contents or nature of the datagram for later use by a routing engine. The metadata can indicate, among other things, the type of data in the datagram, the importance of the datagram, and the encapsulated protocols.

After metadata is associated with the datagram, the appliance can encode (step 540) the datagram using an encoding that follows IPsec policies. The appliance can use any standard IPsec module or system. The SA used by the IPsec module or system can be negotiated ahead of time using commonly understood techniques such as IKE.

After encoding, the appliance can (e.g., using packet analyzer 417) associate (step 550) additional control information to the encoded datagram. The additional information can include, at least, a timestamp and a sequence number. The timestamp and sequence number can be used at the destination endpoint to reorganize datagrams that have taken different paths into the same sequence as they were produced.

The appliance can (e.g., using gateway 420, packet router 421, and sources S1-S3) transmit (step 560) the encoded datagram based on the associated metadata and the appliance's knowledge of the each individual network link. The appliance can favor links having faster response times in order to optimize bandwidth. In some embodiments, the source (e.g., one of S1-S3 from FIG. 4) will be determined solely based on the metadata associated with the datagram. For example, a datagram carrying MPLS data may be tied to a specific network link.

After the datagram is transmitted, the source of the transmission can obtain (step 570) transmission statistics about the specific physical connection used. Those statistics can include, for example, the number of dropped packets, the error rates, the latency, and other analytics related to the physical link. These connection statistics can be provided to the appliance (e.g., using link evaluator 422). The appliance can evaluate (step 580) the connection statistics and provide the evaluations to the appliance (e.g., using packet router 421). Accordingly, the evaluations are updated periodically as the datagrams are transmitted and network conditions fluctuate.

Figure 6:
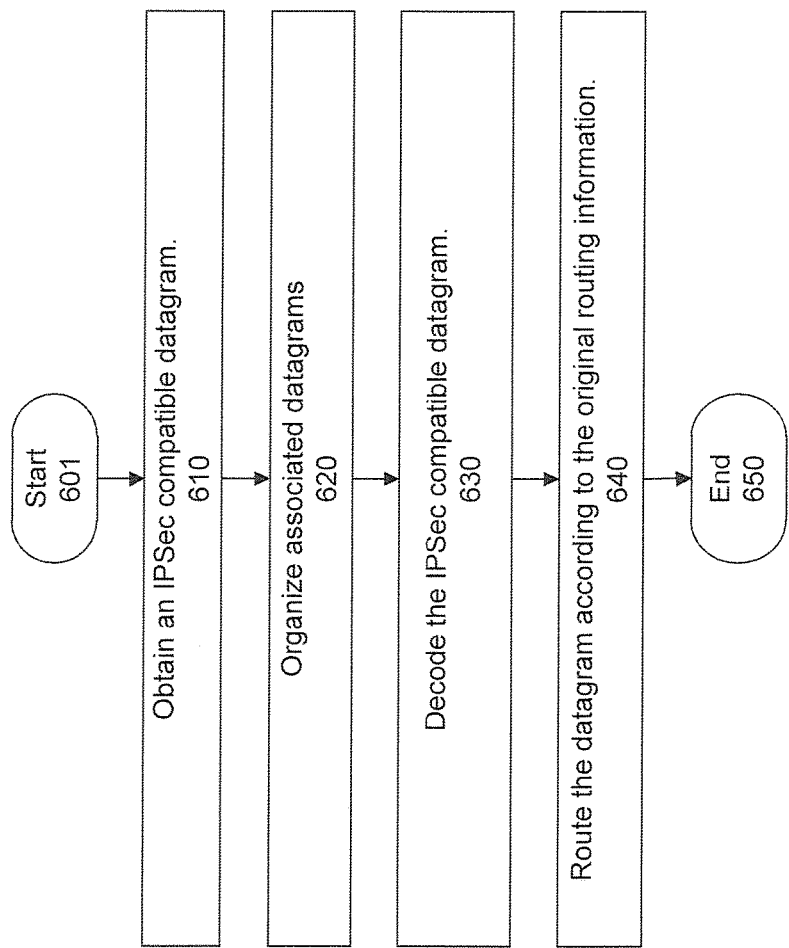
FIG. 6 is a flowchart representing an exemplary method of receiving datagrams, consistent with embodiments of the present disclosure.

FIG. 6 is a flowchart representing an exemplary method 600 for receiving an IPsec encoded datagram from a remote computing environment across multiple physical links. It will be readily appreciated that the illustrated procedure can be altered to delete steps or further include additional steps. After an initial start step 601, an appliance (e.g., appliance 430) can obtain (step 610) an IP datagram encoded using an IPsec compatible encoding. The obtained datagram can originate at a remote client (e.g., client 403) or some other computing device communicatively coupled to the appliance.

After obtaining the datagram, the appliance can organize (step 620) the datagram among other datagrams obtained based on the timestamp and sequence number embedded in the datagram. Although each datagram is individually processed, because the datagrams can be transmitted across any one of many physical links, they may not arrive in the same order in which they were sent. In some embodiments, the organization can occur after the datagram has been decoded.

After organizing the datagram with other associated datagrams, the appliance can decode (step 630) the datagram (e.g., using an IPsec 432 and SA 433) in the proper sequence based on the timestamps and sequence numbers of the related datagrams. The appliance can than route (step 640) the decoded datagram to a computing device (e.g., client 405, client 404, or another device connected to private network 402) according to the original IP header destination.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A system for securing network traffic over multiple connections, the system comprising:
 a classifier executable on an appliance comprising circuitry and configured to associate a first set of metadata with a datagram based on attributes of the datagram, wherein the first set of metadata includes a priority of the datagram and at least one of a source IP address of the datagram or a destination IP address of the datagram;
 an IPsec encoder executable on the appliance and configured to obtain the datagram and to encode the datagram, wherein the IPsec encoder includes an IPsec security association for a plurality of connections between the appliance and a computing entity;
 a packet analyzer executable on the appliance and configured to analyze the encoded datagram and the first set of metadata and to associate, responsive to the analysis, a second set of metadata with the encoded datagram, wherein the second set of metadata includes information for routing the encoded datagram; and
 a gateway configured to:
  select a connection from the plurality of connections according to the second set of metadata associated with the encoded datagram and the priority of the datagram;
  transmit the encoded datagram using the connection of the plurality of connections selected according to the second set of metadata and the priority to the computing entity, wherein each connection of the plurality of connections is associated with the IPsec security association.

2. The system of claim 1, further comprising:
 a link evaluator configured to evaluate the plurality of connections; and
 wherein the packet router is further configured to route the encoded datagram based at least on one of the first set of associated metadata and the second set of associated metadata, and the evaluation of the plurality of connections.

3. The system of claim 1, wherein the first set of metadata associated with the encoded datagram includes at least one of a timestamp or a sequence n umber.

4. The system of claim 1, wherein the computing device is configured to:
 receive one or more encoded datagrams;
 organize the one or more encoded datagrams partially based on the first set of metadata; and
 decode the one or more encoded datagrams using the security association that is associated with the computing entity.

5. The system of claim 1, wherein the computing entity includes at least one of a second appliance and a second gateway and is connected to the gateway via the plurality of connections.

6. The system of claim 1, wherein the IPsec security association defines a set of security parameters for the plurality of connections between the appliance and the computing entity.

7. The system of claim 1, wherein the IPsec security association includes an encryption key for decrypting encoded datagrams transmitted via the plurality of connections.

8. A method for securing network traffic over multiple connections, comprising:
 obtaining, by a first computing entity including circuitry, a datagram;
 associating, by the first computing entity, a first set of metadata with the datagram based on attributes of the datagram, wherein the first set of metadata includes a priority of the datagram and at least one of a source IP address or a destination IP address of the datagram;
 encoding, by the first computing entity, the datagram using an encoding consistent with IPsec, wherein an IPsec security association is associated with a plurality of connections between the first computing entity and a second computing entity;
 analyzing, by the first computing entity, the encoded datagram and the first set of metadata;
 associating, by the first computing entity, responsive to the analysis, a second set of metadata with the encoded datagram, wherein the second set of metadata includes information for routing the encoded datagram;
 selecting a connection of the plurality of connections from the first computing entity to the second computing entity based at least on the second set of metadata associated with the datagram and the priority of the datagram, wherein each connection of the plurality of connections is associated with the IPsec security association; and transmitting the encoded datagram across the selected connection to the second computing entity.

9. The method of claim 8, further comprising:
evaluating the plurality of connections; and
routing the encoded datagram based at least on one of the first set of metadata and the second set of metadata and the evaluations of the plurality of connections.

10. The method of claim 8, wherein the first set of metadata associated with the encoded datagram includes at least one of a timestamp or a sequence number.

11. The method of claim 10, wherein the at least one of the timestamp or the sequence number is used for organizing the one or more encoded datagrams at the computing entity.

12. The method of claim 8, wherein the IPsec security association defines a set of security parameters for the plurality of connections between the first computing entity and the second computing entity.

13. The method of claim 8, wherein the IPsec security association includes an encryption key for decrypting encoded datagrams transmitted across the plurality of connections.

14. A non-transitory computer readable storage medium storing instructions that are executable by one or more processors to cause the one or more processors to perform operations, comprising:

obtaining a datagram;

associating a first set of metadata with the datagram based on attributes of the datagram, wherein the first set of metadata includes a priority of the datagram and at least one of a source IP address or a IP destination IP address of the datagram;

encoding the datagram using an encoding consistent with IPsec, wherein an IPsec security association is associated with a plurality of connections between a first computing entity and a second computing entity;

analyzing the encoded datagram and first set of metadata, associating, responsive to the analysis, a second set of metadata with the encoded datagram, wherein the second set of metadata includes information for routing the encoded datagram;

selecting a connection of the plurality of connections from the first computing entity to the second computing entity based at least on the second set of metadata associated with the datagram and the priority of the datagram, wherein each connection of the plurality of connections is associated with the IPsec security association; and transmitting the encoded datagram across the selected connection one of a plurality of connections from the first computing entity to the second computing entity.

15. The non-transitory computer readable storage medium of claim 14, wherein the set of instructions that are executable by the one or more processors to cause the one or more processors to further perform:

evaluating the plurality of connections; and
routing the encoded datagram based at least on one of the first set of metadata and the second set of metadata and the evaluation of the plurality of connections.

16. The non-transitory computer readable storage medium of claim 14, wherein the metadata associated with the encoded datagram includes at least one of a timestamp or a sequence number.

17. The non-transitory computer readable storage medium of claim 14, wherein the at least one of the timestamp or the sequence number is used for organizing the one or more encoded datagrams at the computing entity.

18. The non-transitory computer readable storage medium of claim 14, wherein the IPsec security association defines a set of security parameters for the plurality of connections between the first computing entity and the second computing entity.

19. The non-transitory computer readable storage medium of claim 14, wherein the IPsec security association includes an encryption key for decrypting encoded datagrams transmitted across the plurality of connections.

* * * * *